United States Patent [19]

Miyatake

[11] Patent Number: 4,479,208
[45] Date of Patent: Oct. 23, 1984

[54] SIGNAL PICKUP DEVICE FOR CAPACITANCE DISK RECORDS

[75] Inventor: Hideaki Miyatake, Machida, Japan

[73] Assignee: Victor Company of Japan, Limited, Japan

[21] Appl. No.: 302,724

[22] Filed: Sep. 16, 1981

[30] Foreign Application Priority Data

Sep. 17, 1980 [JP] Japan .................. 55-132846[U]
Sep. 17, 1980 [JP] Japan .................. 55-132847[U]

[51] Int. Cl.³ .................. G11B 9/06; G11B 17/00
[52] U.S. Cl. .................. 369/43; 369/170
[58] Field of Search .................. 358/322, 338, 342; 369/43, 126, 135, 139, 170, 173

[56] References Cited

U.S. PATENT DOCUMENTS 3,997,716 12/1976 Taylor .................. 358/342 X
4,160,268 7/1979 Goto et al. .................. 369/43
4,170,783 10/1979 Tajima .................. 369/43
4,320,487 3/1982 Guarracini et al. .................. 369/43

Primary Examiner—Donald E. McElheny, Jr.

Attorney, Agent, or Firm—Lowe, King, Price & Becker

[57] ABSTRACT

A signal pickup device for capacitance disk records comprises within a housing a stylus control unit responsive to a control signal to counteract the jitter movement of a capacitance detection stylus and to keep it on the right track while the record is spinning at high speeds. The stylus control unit is positioned so that its stylus moving element is movable in longitudinal and transverse directions parallel to the surface of the record. The stylus control unit includes a pivot member to which the stylus cantilever is magnetically secured by a permanent magnet to provide a pivotal movement in response to the control signal, whereby the stylus is rendered movable exclusively in horizontal directions. The device housing is formed with an opening at the bottom thereof to permit the stylus control unit to be secured therein in order to locate it in a lower position with respect to the record surface. This causes the cantilever to be tilted at a small angle to the record surface and reduces undesirable downward pressure which might occur as a result of the surface variations of the spinning record.

4 Claims, 6 Drawing Figures

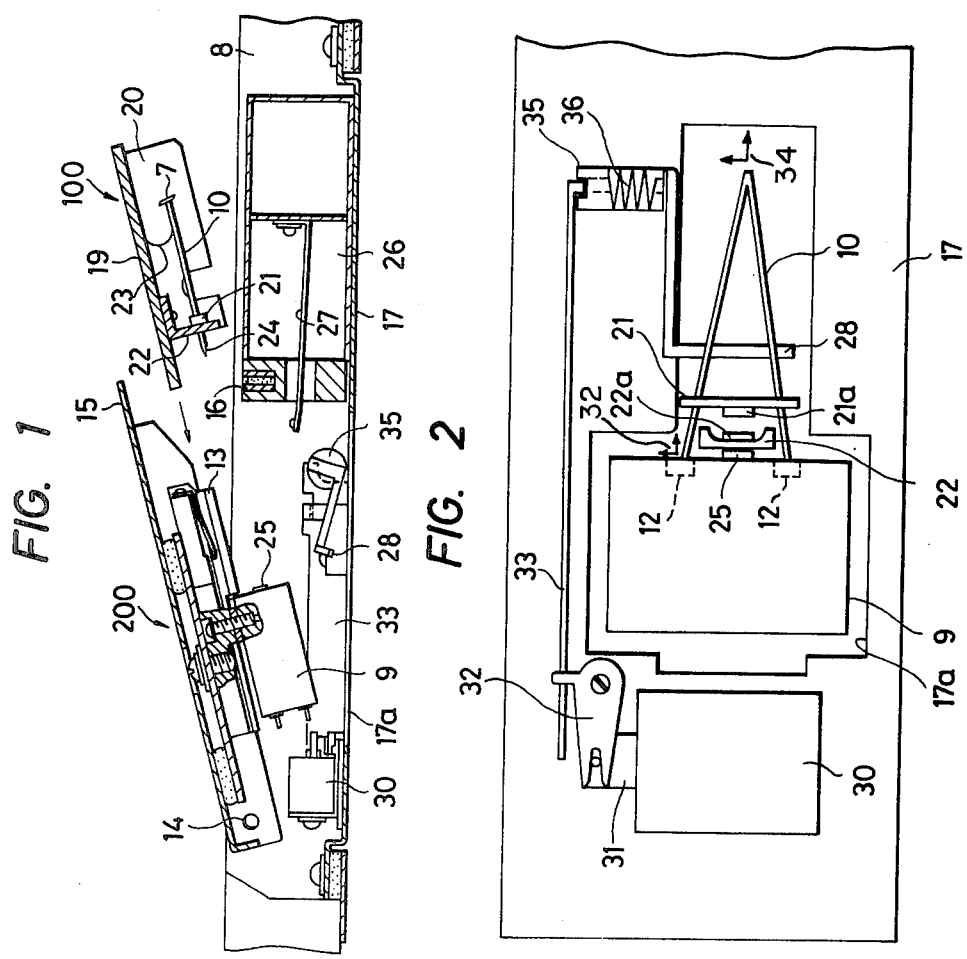

SIGNAL PICKUP DEVICE FOR CAPACITANCE DISK RECORDS

BACKGROUND OF THE INVENTION

The present invention relates to pickup arms for capacitance disk records, and particularly to a signal pickup device which includes a jitter compensation and tracking control system for a capacitance detection type stylus which rests over several tracks of a grooveless capacitance disk.

A signal pickup device for grooveless capacitance disk records, as shown and described in U.S. Pat. No. 4,160,268 assigned to the same assignee of the present invention, comprises a jitter compensation and tracking control unit for counteracting the jitter movement of the capacitance detection stylus and for keeping it on the right track of the record that spins at a considerably high speed. The stylus is secured to the free end of a cantilever or stylus supporting arm, the other end of which is pivotally coupled with the jitter compensation and tracking control unit. Since the jitter compensation involves moving the stylus in a direction parallel to the track and to the record surface while the tracking control involves moving it in lateral directions, the cantilever should be coupled to the control unit by pivot bearings which are capable of such movements. Because of the high rotational speed of the record the stylus must be designed to exert a prescribed amount of pressure to the record and this pressure must be constant and small enough to avoid impairment of the record surface. Signal pickup devices which have hitherto been developed are not satisfactory in this respect. In the aforesaid prior art signal pickup device, the stylus control unit is mounted in a position tilted with respect to the bottom of the device housing and as a result the pivot bearings tend to exert a downward force component in addition to the horizontal components to the stylus in response to the signal applied to the control unit so that the record surface is damaged.

SUMMARY OF THE INVENTION

The present invention eliminates the aforesaid problem by mounting the stylus control unit so that its moving coil or actuator is movable in directions parallel to the surface of the disk record so that the pivot bearings are driven exclusively in directions parallel to the record surface in response to the control signal. The cantilever is detachably coupled to the pivot bearings by a magnetic coupling means so that they extend downwardly at an angle to the record surface, whereby the stylus is rendered movable in horizontal directions in response to the horizontal movement of the pivot bearings.

The undesirable downward pressure is still likely to occur due to the surface variations of the spinning capacitance disk. It is preferable that the stylus control unit be mounted on a level as low as possible with respect to the record surface so that the cantilever keeps contact threwith at a reduced angle.

According to the invention the bottom plate of the device housing is formed with an opening in which the stylus control unit is secured.

BRIEF DESCRIPTION OF THE DRAWINGS

The invention will be further described by way of example with reference to the accompanying drawings, in which:

FIG. 1 is a side cross-sectional view of a signal pickup device of the invention illustrating cartridge and holder assemblies being separated from each other before assemblage;

FIG. 2 is a top plan view of the signal pickup device of FIG. 1 with a top cover being removed;

DETAILED DESCRIPTION

Figure 3:
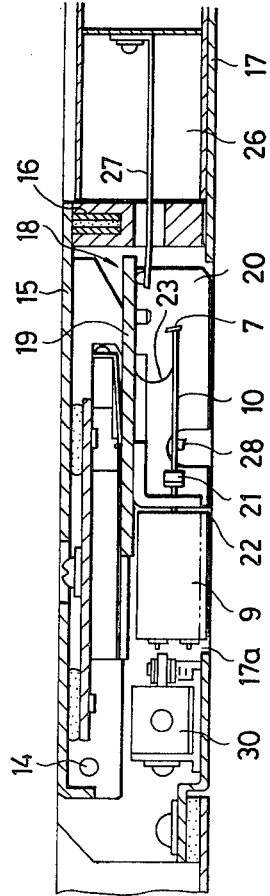
FIG. 3 is a side cross-sectional view of the signal pickup device when the cartridge and holder assemblies are detachably coupled together with the capacitance detection stylus being held in an upward, horizontal position.

A signal pickup device of the invention for grooveless capacitance disk records, shown in FIG 1, is mounted on a drive system, not shown, which drives the signal pickup device in a known manner linearly across the spiral or concentric tracks of a capacitance disc record spinning at high speeds. The signal pickup device comprises a cartridge assembly generally shown at 100, a cartridge holder 200 pivotally mounted at 14 on the side walls of an arm housing 8 to be manually tilted as shown for coupling with the cartridge assembly 100. The cartridge assembly 100 comprises a support plate 19, a pair of side protecting covers 20 secured to the support plate 19, a ferromagnetic bracket 22 having a bore therein secured to the upper plate 19 and a stylus supporting arm or cantilever 10 which is bent to form a V-shaped configuration as seen in FIG. 2. To the apex, or forward end of the cantilever 10 is fitted a capacitance detection type stylus 7 having an electrode attached thereto in a known manner. The rear end portions of the V-shaped cantilever 10 are connected together by a crosspiece or bridge member 21 of a plastic material and extend beyond the bracket 22 through its cutout portions and include a pair of tapered pivots 24. A conductor 23 extends from the stylus electrode to a terminal, not shown, beneath the plate 19 in a position forwardly of the stylus 7. The bridge member 21 and bracket 22 are respectively provided with a small piece of permanent magnet, not shown, so that the cantilever 10 is magnetically secured to the bracket 22 in a position parallel to the suport member 19 when the assembly 100 is detached from the cartridge holder 200.

Figure 4:
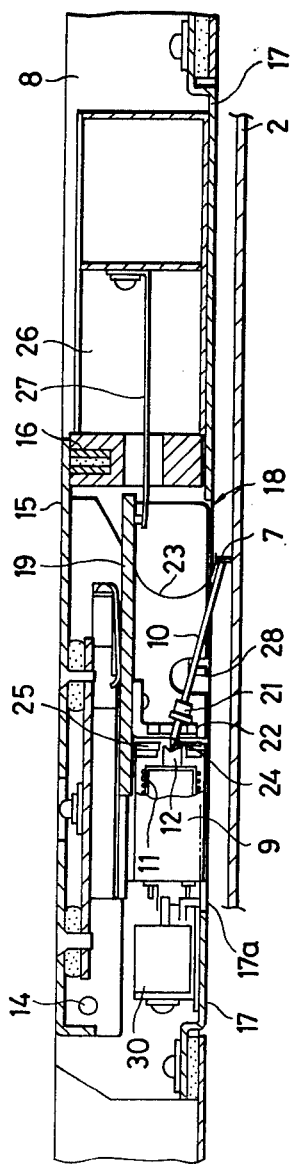
FIG. 4 is a side cross-sectional view of the signal pickup device illustrating the stylus in a downward, tilted position.
Figure 5:
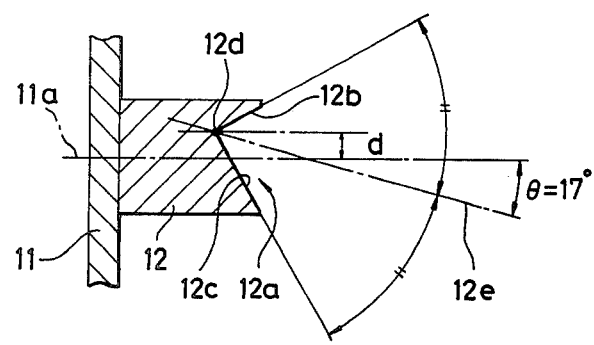
FIG. 5 is an enlarged side view of the pivot member.

The cartridge holder 200 comprises a top plate 15 to which is secured a guide member 13 having a pair of longitudinally extending grooves through which the support plate 19 of the cartridge assembly 100 is inserted. The cartridge holder 200 further includes a stylus control unit or actuator 9 secured to the top plate 15 in a position rearwardly of the guide member 13. The stylus control unit 9 includes a permanent magnet 25 at the forward end thereof to magnetically secure the bracket 22 and cantilever 10 of the cartridge 100 when its top plate 19 is fully inserted into the guide member 13. The signal pickup device further includes a solenoid 30 mounted on a bottom plate 17 of the arm housing. The plunger 31 (see FIG. 2) of the solenoid 30 is coupled by a bell crank 32 and a rod 33 to a spring-biased, pivoted element 35 having a transversely extending stylus lift lever 28. As illustrated in FIG. 4, the stylus control unit 9 includes a moving coil assembly 11 and a pair of pivot bearings 12 secured thereto for unitary movement therewith in a direction parallel to the record track as well as in a direction transverse to the record track respectively in response to jitter correction and tracking control signals generated in a known manner for compensating for jitter movement of the stylus and as well as for keeping it on the right track. Such motion in directions parallel and transverse to the record track is shown by the arrows 32 and 34 at one of the pivot bearings and at the stylus end of the cantilever, respectively. The pivot bearings 12 are formed respectively with V-shaped flat-surfaced, or conically shaped recesses 12a as shown in FIG. 5 for respectively receiving the pivots 24 of the cantilever 10. Preferably, one of the pivot bearings 12 is formed with a V-shaped flat-surfaced recess and the other pivot bearing is formed with a conically shaped recess to allow the one of the pivots 24 which is received in the former recess to move slightly laterally therealong for purposes of providing tolerances for possible manufacturing errors. The pivot bearings 12 are positioned with respect to the cantilever 10 so that when the cartridge 100 is fully coupled with the holder 200 as shown in FIG. 3 the pivots 24 are received respectively in the recesses 12a of the bearings 12 and are moved slightly forward, causing the bridge member 21 to disengage from contact with the bracket 22. As a result the cantilever 10 is free to move and comes to engage the lift lever 28 and is maintained in a horizontal position in which the top plate 15 of the holder is magnetically secured by a magnet 16. A coaxial resonator 26 is mounted on the bottom plate 17. The resonator 26 includes an inner conductor 27 coaxially extending toward the cartridge holder 200 for electrical coupling with the conductor 23.

After the cantilever 10 is detachably coupled with the stylus control unit 9, the solenoid 30 is energized to move its plunger 31 to cause the lift lever 28 to rotate counterclockwise against torsion spring 36 to a lower position (FIG. 4). The arrangement is such that the stylus 7 would be lowered to a position below the position of contact with the record surface so that it provides pressure contact therewith. The rear ends 24 of the cantilever, on the other hand, maintain contact with the pivot bearings 12 due to a pair of magnets 21a, 22a respectively bonded to the bridge member 21 and the bracket 22. The lift lever 28 serves to retract the stylus 7 to the horizontal position when the solenoid 30 is de-energized.

Figure 6:
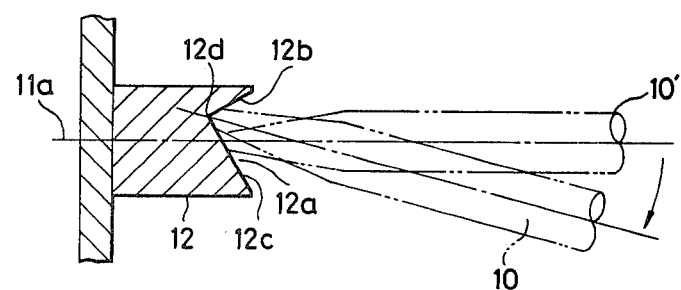
FIG. 6 is an explanatory view of the pivot bearings in relation to the stylus cantilever when the cartridge assembly is coupled with the holder assembly.

Referring to FIG. 5, the V-shaped flat-surfaced recesses 12a of the pivot bearings 12 are defined by upper and lower flat surfaces 12b and 12c which meet at a point or apex 12b. When the cantilever 10 is coupled to the stylus control unit 9, the pivots 24 come to engage the apex 12d and the cantilever 10 lies below a plane 12e which bisects the angle between the surfaces 12b and 12c. The cantilever 10 normally makes an angle of 20 degrees to the horizontal when the stylus is not in contact therewith and is angulated to 17 degrees to the record surface when the stylus is brought into contact with the record. The apex 12d is preferably located a distance "d" above the center horizontal axis 11a of the moving coil assembly 11 so that the lower surface 12c has a greater area than the upper surface 12b. This permits the pivots 24 to make abutment contact with the lower surface 12c at a point lying on the axis 11a as shown in FIG. 6 in dotted lines 10' when the cartridge assembly 100 is inserted to the cartridge holder 200 and subsequently to be guided upward against the lower surface 12c to the apex 12d so that it comes to a downwardly tilted position as shown.

In this tilted position the apex 12d acts as a pivot point for the cantilever 10 to permit the stylus 7 to move vertically with the surface of the disk record which tends to fluctuate vertically due to tolerances as it spins at high speeds. Therefore, when the moving coil assembly 11 is energized in response to a jitter correction and tracking signals, the pivot bearings 13 are caused to move in a longitudinal and lateral directions on a horizontal plane parallel to the record surface, so that the stylus is moved also in the same horizontal directions exclusively by the horizontal force components provided by the moving coil assembly 11, thereby causing no downward pressure on the record 2 in addition to the predetermined amount of downward pressure provided by the cantilever 10.

According to another feature of the invention, the bottom plate 17 of the signal pickup device is formed with an opening 17a as clearly shown in FIG. 2. The stylus driving unit 9 is secured to the top plate 15 so that it is positioned in the opening 17 with its bottom surface lying substantially flat with the bottom plate 17. This arrangement allows the pivot bearings 12 to be positioned in a lower level to reduce the angle between the cantilever 10 and record 2. This angle reduction is advantageous in that it tends to reduce downward pressure variations which might occur in response to the jitter compensation signal or in response to the surface variations of the disk record.

What is claimed is:

1. A signal pickup device mounted on an arm structure movable with respect to a variable capacitance disk record having radially spaced apart tracks, comprising within a housing:

a stylus control actuator having a coil assembly means oriented parallel to the surface of the record and movable in tangential and transverse directions with respect to said tracks in a plane parallel to the surface of said record in response to a control signal applied thereto, said coil assembly means including a pair of pivot bearings which move with said coil assembly means in said tangential and transverse directions with respect to said tracks in a plane parallel to the record surface to counteract the movements of a stylus in said tangential and transverse directions relative to said tracks;

a cantilever having said stylus secured at one end thereof and a pair of pivots at the other end thereof; and means for magnetically detachably coupling said pivots with said pivot bearings so that the cantilever is tilted downwards to the surface of said record to allow said stylus to make contact therewith.

2. A signal pickup device mounted on an arm structure movable with respect to a variable capacitance disk record, comprising within a housing:

a stylus control actuator having a coil assembly oriented parallel to the surface of the record and movable in tangential and transverse directions with respect to a track on said disk in a plane parallel to the surface of the disk in response to a control signal applied thereto, said coil assembly including a pair of pivot bearings which move with said coil assembly in said tangential and transverse directions with respect to said track in said parallel plane, thereby to counteract the movement of a stylus in said tangential and transverse directions with respect to the record track;

a cantilever having said stylus secured at one end thereof and a pair of pivots at the other end thereof; and means for magnetically detachably coupling said pivots with said pivot bearings so that the cantilever is tilted downwards to the surface of said record thereby causing said stylus to move in a plane parallel to the surface of said record in response to movement of said pivot bearings due to movement of said coil assembly in response to said control signal, wherein each of said pivot bearings is formed with a recess into which each of said pivots is magnetically urged by said magnetic coupling means, and wherein each of said recesses is of a V-shaped configuration to permit each one of said pivots to be located at the apex of the V for the pivot bearing thereof, said V-shaped recess having upper and lower surfaces meeting at said apex and a line bisecting the angle between said upper and lower surfaces, said bisecting line being tilted downwards relative to the horizontal.

3. A signal pickup device as claimed in claim 2, wherein said stylus control actuator is mounted on a holding assembly pivotally secured to said housing, and said cantilever is mounted on a cartridge assembly arranged to be detachably coupled with said holding assembly for detachably coupling said pivots respectively with said pivot bearings, said apex of each recess being located in a position displaced upwardly from the center horizontal axis of each pivot bearing.

4. A signal pickup device as claimed in any one of the preceding claims, wherein said housing is formed with an opening in the bottom wall thereof, and wherein said stylus control actuator is positioned in said opening to reduce the angle between said cantilever and the surface of said record.

* * * * *